Aug. 10, 1937.    N. A. CARLSON    2,089,681
DISPENSING STAND
Filed Sept. 23, 1936
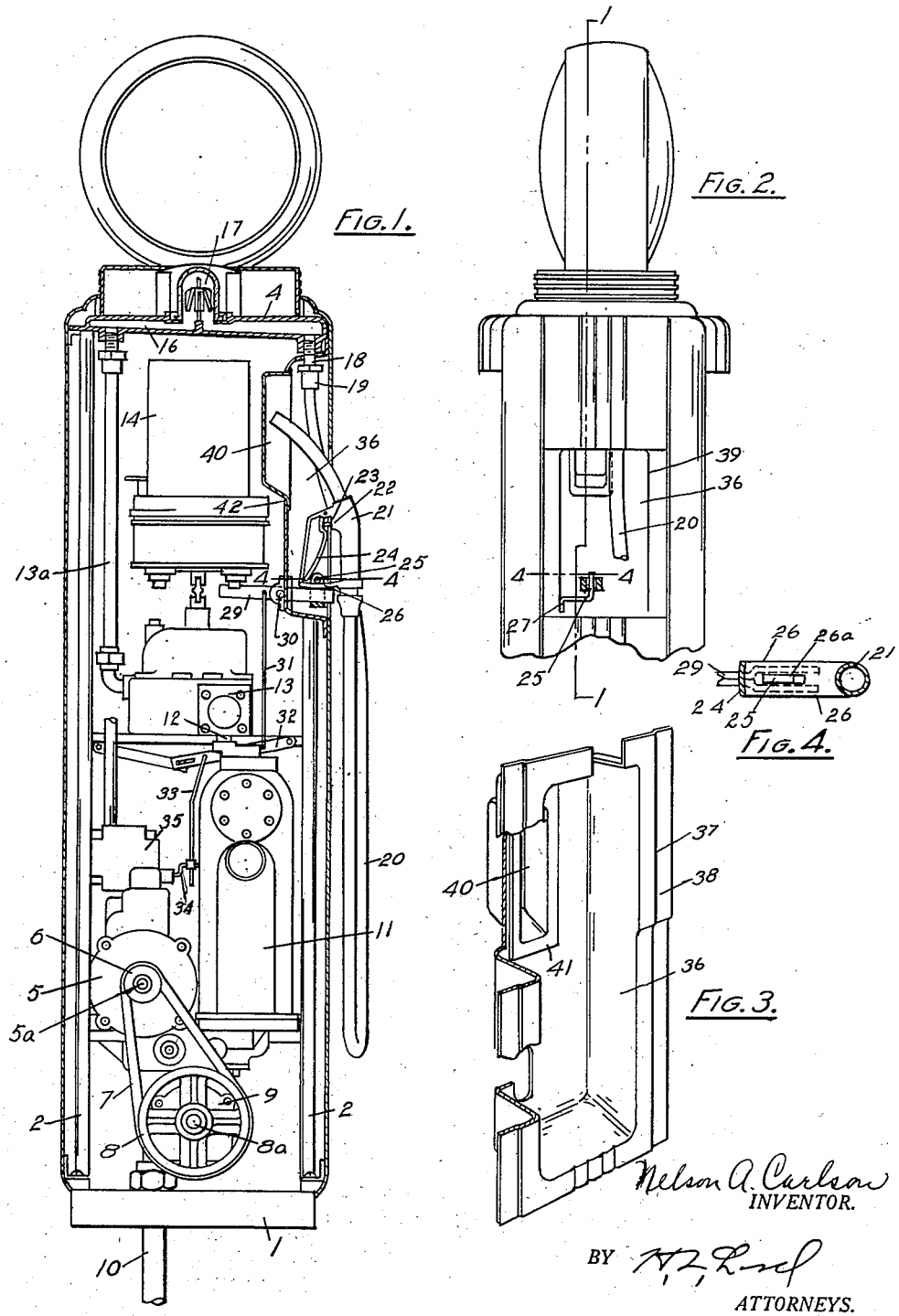
Nelson A. Carlson
INVENTOR.
BY
ATTORNEYS.

Patented Aug. 10, 1937

2,089,681

UNITED STATES PATENT OFFICE 2,089,681

DISPENSING STAND

Nelson A. Carlson, Erie, Pa., assignor to Erie Meter Systems, Inc., Erie, Pa., a corporation of Pennsylvania Application September 23, 1936, Serial No. 102,124

5 Claims. (Cl. 221—95)

This invention is designed to improve dispensing stands such as are used for dispensing gasoline. Such stands are commonly provided with a case in which the active mechanism is mounted and with a hose connection for dispensing the gasoline, the hose connection being hung up along-side of the case, and in many instances actuating the controlling switches with the hanger supports. As commonly used, the hose connection as well as the nozzle supports protrude from the case. This not only is unsightly but puts these parts in position for injury and also adds to difficulty in shipping, so much so that commonly the cases are shipped with the connections dismounted. In the present invention the case is recessed so as to receive the hose handle or support projection, and the support for the nozzle is arranged in the recess. The liquid connection for the hose is also arranged in the recess so that there are no protruding parts extending beyond the case except the hose. Features and details of the invention will appear from the specification and claims.

A preferred embodiment of the invention is illustrated in the accompanying drawing, as follows:—

Fig. 1 shows a section on the line 1—1 in Fig. 2.

Fig. 2 is a side elevation of the case showing the recess.

Fig. 3 a perspective view of the construction of part of the case including the recess.

Fig. 4 is a section on the line 4—4 in Figs. 1 and 2.

1 marks a base, 2 uprights extending upwardly from the base and secured to a top 4, the base top and uprights forming the frame for the stand. A motor 5 is mounted in the frame. It has a motor shaft 5a driving a pulley 6. A belt 7 carries the motion from the pulley 6 to a pulley 8. The pulley 8 is mounted on a shaft 8a which extends to a pump 9. The pump discharges to an air eliminator 11. The air eliminator discharges through a pipe 12 to a metering mechanism 13. A pipe 13a leads from the metering mechanism to a passage 16 in the case top, a fluid indicator 17 being arranged in the passage. The passage terminates in a fitting 18 which is connected by fitting 19 with a hose 20.

The hose has the usual nozzle 21 provided with a dispensing valve 22. The valve has a stem 23 in position to be operated by a handle 24, these parts being as commonly constructed. A perforated hook 25 is carried by bracket 27. The hook is adapted to receive a supporting projection 26 on the nozzle, the projection being provided with a slot 26a for receiving the hook 25. With the support in place on the hook, the handle 24 is back of the hook so that it cannot be operated with the nozzle in position and the perforation of the hook may be utilized for receiving a lock for locking the nozzle in place.

The supporting projection 26 rests on the end of a lever 29, the lever having a slot through which the hook 25 projects. The lever 29 is pivoted at 30 and is connected by a link 31 with a lever 32. The lever 32 is connected by a link 33 with a switch operating arm 34 actuating a controlling switch arranged in the switch box 35, the switch (not shown) controlling the motor. These parts operate substantially as similar parts in stands in common use.

When the nozzle is lifted off the hook the dispensing valve is operated for filling by depressing the handle 24. As the nozzle is lifted off the hook, the lever swings through the gravity forces of the lever 32 to close the switch, and this lifts the slotted end of the lever 30. As the nozzle is returned to the hook the lever 29 is depressed, actuating the linkage described to open the switch.

In the present invention the case is recessed to receive the slotted end of the hook 24, lever 29, and preferably the connections 18 and 19. The support projection 26 extends into this recess into place on the hook and the end of the nozzle is carried in the recess.

The recess is formed by a pocket 36 in a stamping, which stamping is provided with a flange 38 with a shoulder 37. The shoulder 37 engages the edges of an opening 39 in the side of the case and thus forms a flush finish with the face of the case. The recess 36 is extended by means of an extension 40 which has a flange 41, this extension being arranged in an opening 42 in the rear of the pocket or depression 36. This extension provides clearance for the end of the nozzle.

What I claim as new is:

1. In a dispensing stand, the combination of a case having an opening in one side wall thereof; liquid metering means mounted in the case; a dispensing conduit leading from the means having a valve controlled nozzle; a supporting projection on the nozzle; a plate having a recess and a flanged edge substantially closing the opening, a support for the projection in the recess; said plate having an opening in its rear wall and an auxiliary plate having a recess therein arranged in the opening, said auxiliary plate being adapted to receive the end of the nozzle with the supporting projection in place on the support.

2. In a dispensing stand, the combination of a case provided with a recess in one side thereof, said recess having an open front and a permanent rear closure separating at least the major portion of the rear of the recess from the interior of the case; a liquid moving and metering means mounted in the case; a dispensing conduit leading from the means having a valve control nozzle; a supporting projection on the nozzle; and a support for the projection housed in the recess, the open front of the recess being of a size to receive the end of the nozzle and projection in the recess with the projection in position on the support.

3. In a dispensing stand, the combination of a case provided with a recess in one side wall thereof, said recess having an open front and a permanent rear closure separating at least the major portion of the rear of the recess from the interior of the case; a liquid moving and metering means mounted in the case having a dispensing conduit leading from the means and terminating in a hose connection housed in the recess; and a hose attached to the hose connection.

4. In a dispensing stand, the combination of a case provided with a recess in one side thereof, said recess having an open front and a permanent rear closure separating at least the major portion of the rear of the recess from the interior of the case; a liquid moving and metering means mounted in the case; a dispensing conduit leading from the means and terminating in a hose connection housed in the recess; a hose attached to the hose connection; a valve control nozzle on the hose; a supporting projection on the nozzle; and a support for the projection housed in the recess, the open front of the recess being of a size to receive the end of the nozzle and projection in the recess with the projection in position on the support.

5. In a dispensing stand, the combination of a case provided with a recess in one side thereof, said recess having an open front and a permanent rear closure separating at least the major portion of the rear of the recess from the interior of the case; a liquid moving and metering means mounted in the case; a dispensing conduit leading from the means having a valve control nozzle; a supporting projection on the nozzle; and a support for the projection, said support being housed in the recess.

NELSON A. CARLSON.